Dec. 29, 1959     C. O. MERCHANT     2,919,009
CONVEYOR SYSTEM
Filed April 6, 1955     2 Sheets-Sheet 1
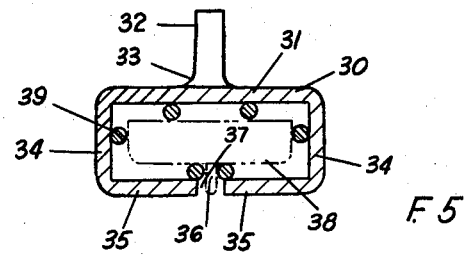
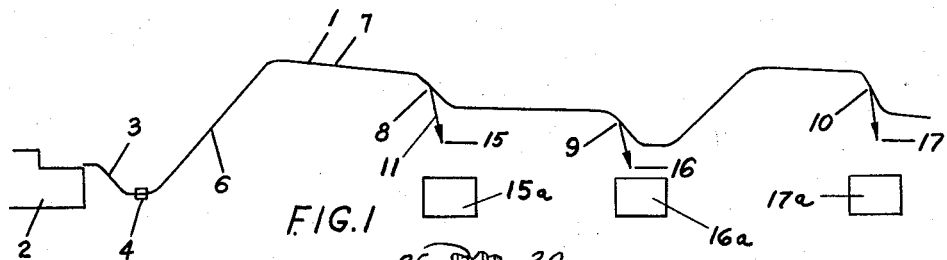
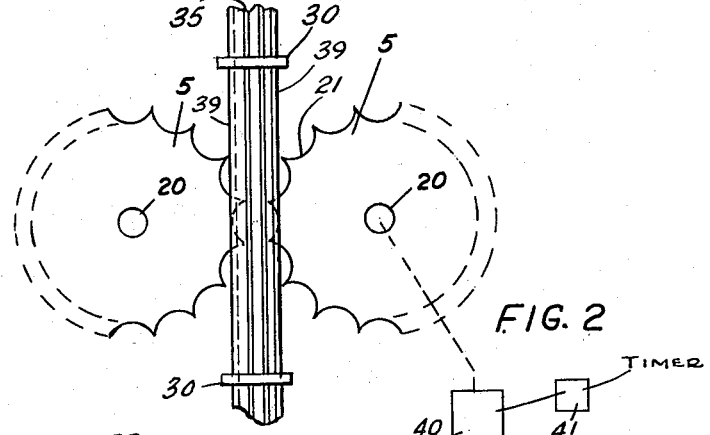
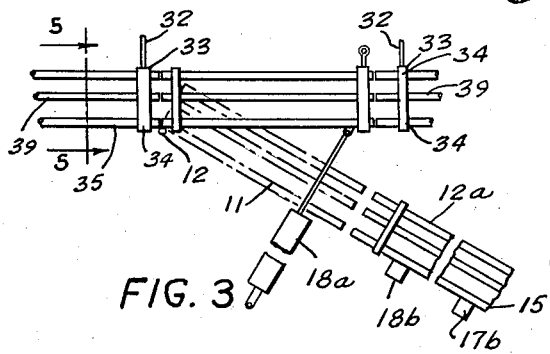
INVENTOR.
CHESTER ORLANDO MERCHANT
BY
Charles L. Lovercheck
attorney Dec. 29, 1959　　　C. O. MERCHANT　　　2,919,009
CONVEYOR SYSTEM
Filed April 6, 1955　　　　　　　　　2 Sheets-Sheet 2
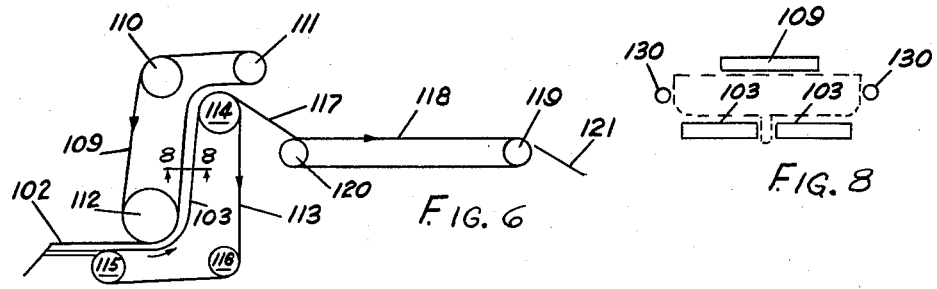
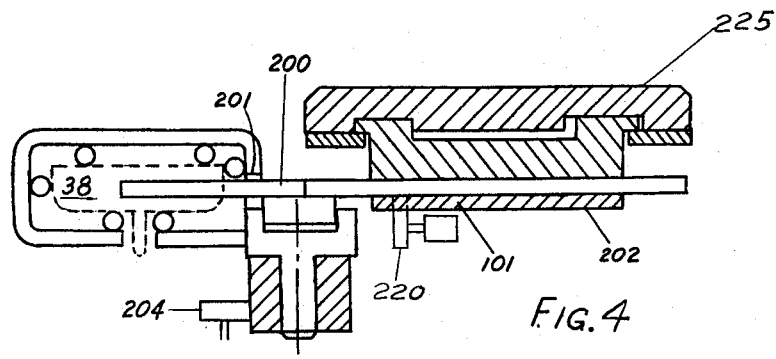
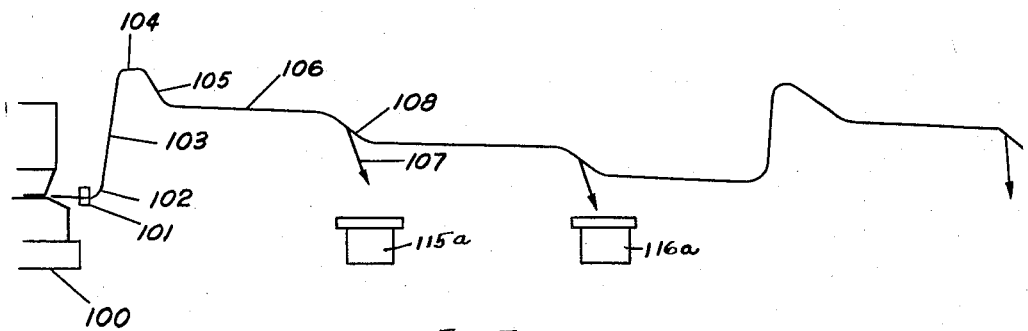
INVENTOR.
CHESTER ORLANDO MERCHANT
BY
Charles L. Lovercheck
attorney 2,919,009
Patented Dec. 29, 1959

2,919,009

CONVEYOR SYSTEM

Chester Orlando Merchant, Harborcreek Township, Erie County, Pa., assignor to Swanson Tool & Machine Products, Inc., Erie, Pa., a corporation of Pennsylvania Application April 6, 1955, Serial No. 499,568

2 Claims. (Cl. 198—19)

This invention relates to automatic machines and more particularly to machines for filling light bulb bases from filling machines to basing machines.

In machines made according to prior designs for use in delivering light bulb bases from machines where the cement for attaching a glass to the base was placed in the base, the machines were not able to accomplish as high a production rate as desirable. It has been discovered that by utilizing a specific layout of base handling track and side tracks in a basing machine operation, it is possible to accomplish a much higher production rate than has been possible heretofore with known equipment. With the base filler which is referred to herein as straight line base filler, the output may be as high as from four thousand to sixteen thousand bases per hour, depending upon the type of base to be filled. The bases are presently either placed in trays by operators or discharged into containers and then carried to groups of basing machines where they are used. These basing machines may require one thousand to two thousand bases per hour each to keep them running constantly.

The purpose of this invention is to correlate the operation of base filling and the basing operation which is the operation of attaching the bases and thus eliminating unnecessary handling and carrying of bases. In the present disclosure, the discharged bases from the filler are delivered into a track or conveyor which will then elevate the bases to the height near the ceiling of the room or approximately twelve to fifteen feet. The bases will then be carried along the track horizontally or at a slightly downward slope. At each basing machine, a sensing device will be installed and when each side track to a basing machine is filled, the switch track will then switch into the main line carrying bases on to the next machine. If all the tracks are filled, the base filler will be stopped. As soon as the supply in any track drops to a predetermined level, its switch track will operate and the base filler will start operating. The base filler must be capable of supplying a quantity of bases equal or exceeding the demands of the basing machines being supplied.

An object of this invention is to provide a base filling machine for light bulb bases which is simple in construction, economical to manufacture, efficient in use, and capable of delivering light bulb bases to a basing machine at a high production rate.

Another object of the invention is to provide a machine for delivering light bulb bases directly and automatically from a base filler machine to a basing machine.

A further object of the invention is to provide a specific type of rotating light bulb base pushing mechanism.

Another object of this invention is to provide a specific type of track mechanism for use in a light bulb basing machine.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

Fig. 1 is a side view of a layout of a track for carrying light bulb bases from a filler machine to a battery of basing machines;

Fig. 2 shows a bottom view of a specific type of pusher mechanism;

Fig. 3 is an enlarged top view of a track mechanism;

Fig. 4 is a cross sectional view of a specific type of pusher mechanism;

Fig. 5 is a cross sectional view taken on line 5—5 of Fig. 3;

Fig. 6 shows another embodiment of a track mechanism;

Fig. 7 shows a layout of a track for use with the embodiment of the invention shown in Fig. 6; and Fig. 8 is a cross sectional view taken on line 8—8 of Fig. 6.

Now with more specific reference to the drawings, Fig. 1 shows a layout of a track shown in the cross section in Fig. 5. A machine 2 represents the machine which is adapted to automatically deposit the correct amount of cement into each cup like member which comprises the base of a light bulb, vacuum tube, or like member. The base is then slid down the incline portion 3 of the track. The purpose of the downward incline is so that any intermittent characteristic of feed of bases from the filling machine 2 will be absorbed in the backlog of bases which will be deposited in the vertical portion 3.

The pusher mechanism such as shown in Fig. 2 or in Fig. 4 will be located at the horizontal portion 4 of the track and wheel members 5 will be rotated by means of a motor or other power driving means. This will force the bases upward along the upwardly inclined portion 6 of the track and onto the horizontally inclined portion 7. The horizontally inclined portion 7 may be inclined slightly downward as shown and the side track will branch off at 8 and 9 such as shown in Fig. 3 and at the end of each side track, the basing machines 15a, 16a, and 17a will be located. The side track mechanisms are made up of the outwardly swinging portions 11 of the track which are made of parallel rods like rods 39 and are preferably pivoted at 12 and are adapted to swing into alignment with the track member portion 7 in Fig. 3, for instance, and into alignment with the portion 12a whereat the side 13 of the side track will intersect the line of filler material in the main portion 7 of the track and direct the bases into the switch track portion 12a. The filler side track members will be stationed at 8, 9 and 10 and will deliver the bases to the basing machines 15a, 16a, and 17a disposed at 15, 16, and 17, respectively.

Since the filling machine 2 has a capacity greater than the total capacity of the basing machines 15a, 16a, and 17a, a continuous flow of bases will be assured to each machine since a sensing mechanism such as a limit switch or a photoelectric cell will be disposed at 17b and another at 18b. When the supply of bases in any of the switch tracks between the points 17b and 18b is exhausted, that is, has flowed onto the basing machine 15a, the sensing mechanism 17b will actuate a solenoid 18a which will pull the side track 13 into alignment with the track 12a and divert the flow of bases from the main line 7 to the machine 2 at 15 until the bases in the section 12a of track have filled the track to a point beyond the sensing mechanism 18b. The side track 12a has a capacity sufficient to contain a supply of bases to operate the basing machine 15a for a predetermined period of time. When bases fill the side track back to the device 18b, the solenoid 18a will be again actuated to drive it into alignment with the track 7 and it will again drive bases on through the line to the next side track 9 or 10, whichever may happen to be actuated by the solenoid corresponding to solenoid 18a. The switch tracks to the basing machines 16a and 17a will be supplied in a manner similar to the manner in which machine 15a is supplied. When the supply of bases between the sensing mechanisms 17b and 18b has again been depleted, the sensing mechanism 17b will again actuate the switch track station 11 to again drive bases into the side track 13.

The pusher mechanism shown in Fig. 2 is made up of the two wheels 5, as mentioned previously, driven by motors on shafts 20. The wheels 5 have arcuate notches 21 in the surface thereof which fit around the bases and drive them forward positively and continuously.

The track mechanism shown in cross section in Fig. 5 is made up of the parallel guide rods 39 supported in bracket sections 30 having a top member or plate 31 attached to a hanger 32 which may be supported from a ceiling or otherwise supported and which is welded at 33 to the plate 31. The bracket then extends downward at both sides at 34 and is bent inwardly to form bottom supports 35 which terminate in spaced relation to each other to leave a groove 37 which receives the base pins 36 of a base member 38 which is adapted to be fed through the track. The guide rods 39 are spaced around the inside of the track and the base members slide on the rods and, thereby, prevent jamming.

In the embodiment of the invention shown in Figs. 6 and 8, a base filler machine 100 is shown which has a feed mechanism in Fig. 6 mounted at 101 in a horizontal portion 102 of the track. The bases from the feed mechanism are elevated in a vertical portion 103 and slide along the horizontal portion 104 and down at 105 along the horizontal portion 106 where a general supply of the bases is provided. The side track mechanism 107 is provided in a downwardly inclined portion 108.

The vertical portion 103 of the track is made up of a belt 109 which runs in the direction indicated by the arrows on pulleys 110, 111, and 112. A belt 113 runs on pulleys 114, 115, and 116 in the direction indicated by the arrows which is the same direction the belt 109 runs. Switches or other sensing devices will be installed in the side track members in a gravity portion 117. The belts 113 and 109 will have the same surface speed as the speed the bases are fed from the filling machines 100 to the horizontal portion at 102. The bases will move out of the filling machine 100 and up between the belts 113 and 109 and slide down the gravity portion 117 onto the horizontal belt 118 which is driven by pulleys 119 and 120 and discharges bases onto the switch track 121. The belts 13 are two in number and there is one belt 109 as shown in Fig. 8. A guide rod 130 is provided at each side of the belts 113 and 109 to hold the bases on the track. The side track devices are similar to those shown in Fig. 3.

The shuttle bar mechanism is made up of a shuttle 200 which extends through a slot 201 in the side of a track. The track may be of the shape shown in Fig. 5 and is adapted to carry a base such as base 38. The shuttle 200 is carried on a horizontal slide 202 which is driven by an oscillating mechanism such as a cam 220 which is mounted on a motor as shown in Fig. 4 and a cam operating in a vertical plane such as cam 204 which moves the shuttle 200 in and out in a direction at right angles to cam 220. Therefore, the shuttle 200 will be moved along ways 225 by cam 220. Then it will be moved in as the cam 220 rotates and be pushed forward by the cam in vertical plane thereto. The mechanism shown in Fig. 4 can be substituted for the pusher mechanism shown in Fig. 2.

In operation, the base machine shown in Fig. 1 is supplied by bases filled with cement by the filler machine 2. The bases slide down the track section 3 and supply constant flow of bases to the rotating base pusher 4 which drives the bases up the section 6 and across the horizontal section 7 and into the side section 8, 9, or 10, whichever happens to be actuated to divert the flow of bases to the particular basing machine. As one section of track, for example, the section between points 17b and 18b, is filled, the section 11 will be swung back into alignment with the main section of the track and, thereafter, the bases will be pushed onto the next section which happens to be depleted. When all of the sections are filled, the base pusher 4 will be stopped.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A conveyor system for selectively conveying articles from a source to a processing machine comprising a source adapted to discharge articles, a conveyor having a portion extending from said source at a downwardly inclined angle, a feeding device disposed at the bottom of said inclined portion, said conveyor inclined upwardly from said feeding device at a relatively steep angle to a predetermined altitude, then extending substantially level, and then sharply downwardly to a switch mechanism, and a main line portion extending substantially horizontally from said switch mechanism, then downwardly to a second switch mechanism, and then horizontally from said second switch mechanism, each said switch mechanism having means to divert said articles from said main line portion to a processing machine, spaced sensing means on each said switch mechanism, actuating said means to divert said articles, diverting said articles from said switch mechanisms when the spaces between said switch mechanisms contain a predetermined number of said articles, and diverting articles from said switch mechanisms when said switch mechanisms contain less than a predetermined number of articles, said conveyor being rectangular in cross section having a rectangular path therethrough and a slot in the bottom thereof to receive a projecting member on each article to be conveyed.

2. A conveyor system for selectively conveying articles from a source to a processing machine comprising a source adapted to discharge articles, a conveyor having a portion extending from said source at a downwardly inclined angle, a feeding device disposed at the bottom of said inclined portion, said conveyor inclined upwardly from said feeding device at a relatively steep angle to a predetermined altitude, then extending substantially level, and then sharply downwardly to a switch mechanism, and a main line portion extending substantially horizontally from said switch mechanism, then downwardly to a second switch mechanism and then horizontally from said second switch mechanism, each said switch mechanism having means to divert said articles from said main line portion to a processing machine, spaced sensing means on each said switch mechanism, actuating said means to divert said articles, diverting said articles from said switch merchanisms when the spaces between said switch mechanisms contain a predetermined number of said articles, and diverting articles from said switch mechanisms when said switch mechanisms contain less than a predetermined number of articles, said conveyor comprising spaced, parallel guide rod members disposed on the inside surface of said conveyor and extending parallel thereto.

(References on following page)

References Cited in the file of this patent

UNITED STATES PATENTS

| | | |
|---|---|---|
| 1,407,923 | Buck | Feb. 28, 1922 |
| 1,861,335 | Cain et al. | May 31, 1932 |
| 2,379,713 | Hohl | July 3, 1945 |
| 2,424,055 | Rousseau | July 15, 1947 |
| 2,558,751 | Hebert | July 3, 1951 |
| 2,612,815 | Britt | Oct. 7, 1952 |

OTHER REFERENCES

Chainveyor Catalog, U.S. Spring and Bumper Co., Los Angeles, Calif., pp. 5 and 10.